United States Patent [19]

Jönsas et al.

[11] Patent Number: 4,794,497
[45] Date of Patent: Dec. 27, 1988

[54] VEHICLE SUN VISOR WITH ILLUMINATED MIRROR

[75] Inventors: Mats Jönsas, Mora; E. Gunnar Svensson, Malung, both of Sweden

[73] Assignee: Autopart Sweden AB, Mora, Sweden

[21] Appl. No.: 121,877

[22] Filed: Nov. 17, 1987

[30] Foreign Application Priority Data

Dec. 2, 1986 [SE] Sweden .................... 8605173

[51] Int. Cl.$^4$ ............................. F21V 33/00
[52] U.S. Cl. ..................... 362/143; 362/137; 362/141; 362/144; 296/97.5
[58] Field of Search ............ 362/135, 137, 140, 141, 362/142, 143, 144; 296/97 R, 97 B, 97 H

[56] References Cited

U.S. PATENT DOCUMENTS

| 3,926,470 | 12/1975 | Marcus | 296/97 B |
| 4,174,864 | 11/1979 | Viertel et al. | 362/144 X |
| 4,421,355 | 12/1983 | Marcus | 296/97 H |
| 4,541,663 | 9/1985 | Schwanitz et al. | 362/144 X |

FOREIGN PATENT DOCUMENTS 3222194 12/1983 Fed. Rep. of Germany .
430675 12/1983 Sweden .

Primary Examiner—Stephen F. Husar
Attorney, Agent, or Firm—Young & Thompson

[57] ABSTRACT

The invention relates to a sun visor for motor vehicles with an illuminated mirror (6) and a cover (7). The lighting (8) is arranged in the cover and is turned on and off as the cover is opened and closed.

5 Claims, 1 Drawing Sheet

VEHICLE SUN VISOR WITH ILLUMINATED MIRROR

BACKGROUND OF THE INVENTION

The present invention relates to a sun visor for motor vehicles with a mirror, a mirror light, and a cover, the latter being pivotable at least between a closed position, in which it completely covers the mirror, and a position, in which it completely exposes the mirror.

BRIEF DESCRIPTION OF THE PRIOR ART

A sun visor of the above mentioned type is previously known by for example U.S. Pat. No. 3,926,470, in which a lighting unit is arranged in the sun visor at each vertical short side of the mirror. The cover is pivoted at the upper edge of the mirror and is long enough so that it covers the mirror and the lighting units on either side of the mirror. When the cover is opened, the light is turned on, and by swinging the sun visor forward past its vertical position, the light can also be used as a map reading lamp for example, whereby the cover serves as a "lamp shade". In this case there is a need to be able to vary the light intensity depending on whether the light is used to illuminate a person who is looking in the mirror or it is used to illuminate a map for example. In the former case, it is generally desirable to have a lower light intensity and for this purpose the known sun visor is provided with means for switching between full and dim lighting.

SUMMARY OF THE INVENTION

The purpose of the present invention is to provide a sun visor of the type described by way of introduction which is more versatile as regards adaptability of the lighting to the need in question than is the known sun visor and which is also more simple by making this possible without using any extra electrical switching means.

This is achieved according to the invention by virtue of the fact that the mirror lighting comprises at least one lighting unit carried by the cover, the lighting unit being mounted on that side of the cover which faces the mirror in the former position.

Placement of the lighting in the cover provides a number of advantages, amongst them the possibility of carrying the direction of light flow in relation to the mirror so that the person looking in the mirror can select which portion of the face is to be most illuminated by directing the light for example first towards the mouth and then by swinging the cover up further, towards the hair. For using the lighting as a map lamp, the flow of light can be directed by swinging the cover out so that the mirror serves as a reflector.

In modern sun visors consisting of a film-covered foam plastics body, components, such as a pair of bearing mountings, a snap spring and a reinforcing wire frame, molded into the foam plastics body. These components determine the available space for an insert consisting of a mirror and lighting. It is generally desirable to make the mirror as wide as possible, and the solution according to the invention also has the advantage that the entire width of the available space can be used for the mirror itself.

BRIEF DESCRIPTION OF THE FIGURES

The invention will be described in more detail with reference to an example shown in the accompanying drawings, where.

DETAILED DESCRIPTION

Figure 1:
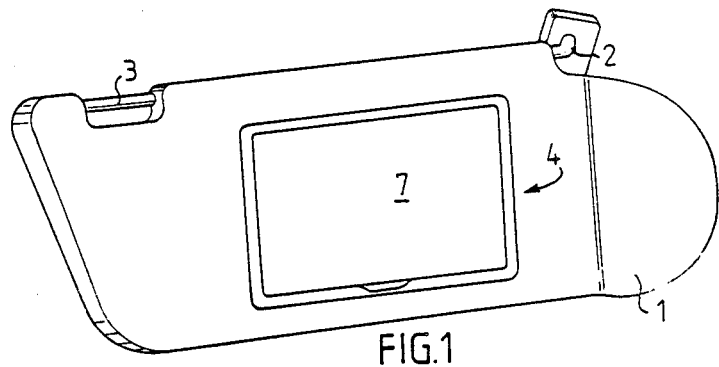
FIG. 1 shows a perspective view of a sun visor according to the invention with the cover closed.
Figure 2:
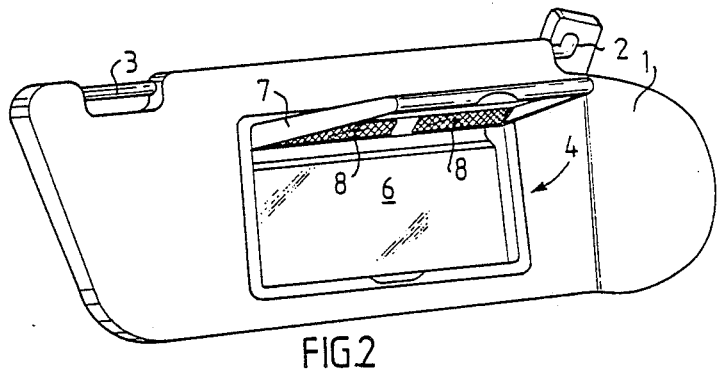
FIG. 2 shows the sun visor of FIG. 1 with the cover open.

In FIGS. 1 and 2, 1 designates a sheet of filmcoated foamed plastic, which contains a bearing for a main shaft 2, a holder for a shaft 3 and a reinforcing steel wire frame, forming a vehicle sun visor of a type known per se.

The sheet 1 is made with a depression in which a mirror lighting insert is mounted, generally designated 4.

Figure 3:
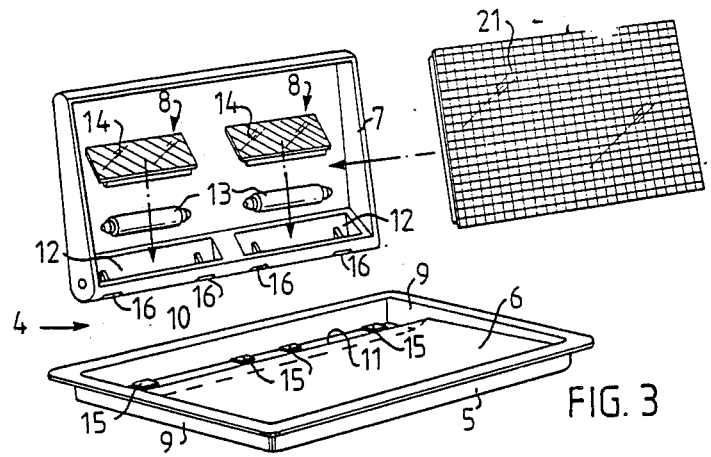
FIG. 3 shows an exploded view of a mirror insert with cover as shown in FIGS. 1 and 2.

The insert 4, as shown in more detail in FIG. 3, consists of a rectangular cup 5 with a reflective surface 6 and a cover 7 with two lighting units 8. The cup 5 can be a plastic cup in which a separate glass mirror is glued, a one-piece metal cup with a highly polished metal surface 6 or a metallicized plastic cup. The cover 7 is pivotally mounted in a manner not shown in more detail here in opposing side walls 9 of a depression 10 in the cup above the upper edge 11 of the reflective surface 6. The cover is also joined in a manner not shown in more detail here with a mechanism which makes it possible to fix the cover at different angular positions relative to the mirror surface 6. This mechanism can comprise spring means, cam elements, and/or frictional elements.

As is most clearly revealed in FIG. 3, each lighting unit 8 consists of a lamp holder 12 in one piece with the cover 7, a tube lamp 13 and a transparent plate 14 which covers the lamp and has a surface structure which diffuses the light. The plate 14 forms a 45° angle with the cover, which means that the light in the cover position shown in FIG. 2 primarily illuminates the lower half of the face of a person looking into the mirror. By swinging the cover up slightly from the position shown in FIG. 2, the light can be directed towards the upper half of the face. If the cover is swung down somewhat from this position, a portion of the light beam is directed towards the mirror which then serves as a reflector and provides a directed flow of light downwards, when the sun visor is swung forwards for use of the lighting as a map light.

When the cover 7 is completely closed, the lighting units 8 are housed in the depression 10 of the mirror.

FIG. 3 also indicates an alternative embodiment of the lighting. Instead of using two separate lighting units 8, with individual transparent plates 14, the lighting units can be arranged behind a common transparent plate 20, which covers the entire inside of the cover 7. The lamps do not then need to be placed precisely as shown in FIG. 3. Rather they can be placed in any suitable location on the inside of the cover. Certain minor modifications obvious to the person skilled in the art and not shown here of the cover itself in the region of the lamp holders 12 shown in the Figure, can be required to enable the plate 20 to be fixed to the inside of the cover. It may also be necessary to place the reflective surface 6 deeper in the cup 5, since the entire cover tends to become thicker. The plate is suitably made with a surface structure causing the light to be refracted towards the person looking in the mirror. The surface can for example be made up of tiny prisms, as indicated by the crossed pattern 21 in FIG. 3.

The current to the lamps 13 is controlled with the aid of current-connected contact terminals 15 on the cup 5 and contact terminals 16 on the cover 6. These terminals are arranged so that the current to the lamps 13 is broken when the cover is closed (FIG. 1), and is connected when the cover has been swung out a short distance from the closed position, as the contact terminals 16 come into contact with the terminals 15.

We claim:

1. A sun visor for motor vehicles comprising a mirror, mirror lighting means and a cover pivotable between a closed position in which it completely covers the mirror and a position in which it completely exposes the mirror characterized in that said mirror lighting means comprises at least one lighting unit including an incandescent lamp, said lighting unit being mounted on a side of said cover which faces said mirror when said cover is in the closed position; and said cover includes a transparent plate which extends essentially across the entire cover surface facing said mirror and covers said incandescent lamps of said at least one lighting unit mounted on said cover.

2. Sun visor according to claim 1, characterized in that the transparent plate (20) has a structured surface to refract the light, so that at least a major portion of the light flow is directed away from the mirror (6), when the cover (7) forms approximately a right angle with the mirror.

3. A sun visor for motor vehicles comprising a mirror, mirror lighting means, and a cover pivotable between a closed position in which it completely covers the mirror and a position in which it completely exposes the mirror characterized in that said mirror lighting means comprises (a) at least one lighting unit including an incandescent lamp, said lighting unit being mounted on a side of said cover which faces said mirror when said cover is in the closed position and adjacent the pivot axis of the cover, said lighting means further extending over a major portion of the width of said cover; and (b) at least one transparent planar plate which covers at least the incandescent lamp, said plate being arranged at an angle relative to the plane of said cover, whereby light from said lighting means may be directed in accordance with the position of said cover relative to said mirror.

4. Sun visor according to claim 3, characterized in that the mirror surface (6) is formed in a four-sided plastic cup (5), and that the cover (7) is pivoted in opposite side edges (9) of the cup at a deeper portion (10) of the cup adjacent the mirror surface, in which portion the lighting unit (8) is housed in the closed position of the cover.

5. Sun visor according to claim 3, characterized in that the cover (7) and its carrier (5) have cooperating contact elements (15,16), which are so arranged and connected to a current source, that the current to the lighting unit (8) is broken in the closed position of the cover and is connected after the cover has been swung out a certain angle from the closed position.

* * * * *